United States Patent [19]

Hyner et al.

[11] E Re. 29,239

[45] Reissued May 31, 1977

[54] TERNARY ALLOYS

[75] Inventors: Jacob Hyner; Robert A. Michelson, both of Waterbury, Conn.

[73] Assignee: Whyco Chromium Company Inc., Thomaston, Conn.

[22] Filed: Sept. 17, 1975

[21] Appl. No.: 614,349

Related U.S. Patent Documents

Reissue of:

[64] Patent No.: 3,881,919
Issued: May 6, 1975
Appl. No.: 431,025
Filed: Jan. 7, 1974

[52] U.S. Cl. ..... 75/175 R; 75/170; 75/171; 75/175 A; 204/43 T

[51] Int. Cl.[2] ..... C22C 13/00

[58] Field of Search ..... 75/134 T, 134 B, 134 F, 75/134 N, 175 R, 175 A, 170, 171

[56] References Cited

UNITED STATES PATENTS

| | | | |
|---|---|---|---|
| 2,853,382 | 9/1958 | Klochkov | 75/175 R |
| 3,856,513 | 12/1974 | Chen et al. | 75/122 |
| 3,871,836 | 3/1975 | Polk et al. | 29/194 |

*Primary Examiner*—L. Dewayne Rutledge
*Assistant Examiner*—E. L. Weise
*Attorney, Agent, or Firm*—DeLio and Montgomery

[57] ABSTRACT

Bright, tarnish resistant and color stable ternary alloys of about 40 – 90% of tin, about 10 – 50% cobalt and about 1 – 28% of a third metal of Periodic Group $II_B$, $III_B$ or $VI_B$. Typical third metals are zinc, cadmium, indium, antimony or chromium. The alloys are electrodeposited from aqueous acidic baths at a temperature of about 50 – 85° C and current density of about 5 – 45 A/ft.

2 Claims, No Drawings

TERNARY ALLOYS

Matter enclosed in heavy brackets [ ] appears in the original patent but forms no part of this reissue specification; matter printed in italics indicates the additions made by reissue.

BACKGROUND OF THE INVENTION

This invention relates to new and improved ternary alloys, to aqueous electrolytic baths from which the alloys are deposited, and to a process for forming the alloys.

Various alloys have been developed in efforts to duplicate the superior color of chromium and alloys containing substantial amounts of chromium, while also providing the corrosion resistance and tarnish resistance required when the alloy is to be used as a protective coating. Accordingly, the prior art teaches the addition of brightening agents to plating baths for the electro-deposition of tin-nickel binary alloys, as in U.S. Pat. No. 3,141,836 — Seyb et al, or the careful control of plating conditions, also in the deposition of nickel-tin binary alloys, such as the highly acidic baths in U.S. Pat. No. 2,926,124 — Taylor et al. In another approach cobalt-tin binary alloys have been studied with respect to close similarities in corrosion resistance to nickel-tin alloys. Clarke et al, "An Electrodeposited Bright Tin-Cobalt Intermetallic Compound, CoSn," Transactions of the Institute of Metal Finishing, 1972, Volume 50.

Despite the usefulness of such alloys from the standpoint of tarnish and corrosion resistance, those of such alloys which initially exhibited brightness similar to that of chromium did not maintain the good color. Moreover, results in obtaining hardness, brightness, tarnish resistance and color stability have not been consistent. Such properties tend to be overly sensitive to specific process conditions and therefore are difficult to reproduce on a commercial scale.

OBJECTS AND SUMMARY

Accordingly, an object of the invention is to provide a new and improved alloy which not only provides a chromium-like brightness and tarnish resistance, but also provides color stability and hardness superior to that found in any of the alloying metals individually.

Still another object of the invention is to provide new and improved electrolytic plating baths which are easily formulated and from which ternary alloys can be efficiently deposited on a wide variety of substrates to give coatings which are hard, bright, tarnish resistant and which have good color stability.

Another object is to provide a new and improved process whereby tin, cobalt and a third metal are electrolytically co-deposited to form a hard, bright coating which is stable and highly resistant to tarnishing.

These and other objects, features and advantages of the invention will be apparent from the description which follows.

In summary outline, the foregoing and other objects are achieved in a new and improved ternary alloy consisting essentially of about 40 – 90 wt. % tin, about 10 – 50 wt. % cobalt and about 1 – 28 wt. % of a third metal selected from Periodic Group $II_B$, $III_A$ or $VI_B$. Third metals include zinc, cadmium, indium, antimony or chromium, of which zinc, indium and chromium are preferred. The third metals may be present in the alloy singly or in admixtures of two or more. The plating baths of the invention are aqueous and highly acidic, and contain compounds providing stannous ions, cobaltous ions and ions of the third metal or metals to be deposited. The ternary alloys are efficiently co-deposited from the baths at a temperature of about 50 – 85° C. and current density of about 5 – 45 A/ft.$^2$. In addition to the tarnish resistance expected in alloys containing tin and cobalt, the alloys exhibit a hardness, chromium-like brightness and color stability which make them useful as coatings on a wide variety of substrates.

DESCRIPTION OF THE PREFERRED EMBODIMENTS

The ternary alloys of the invention are electrodeposited from highly acidic, aqueous baths of pH of about 1–3. A mineral acid is utilized for this purpose, such as a hydro-halide or a sulfur acid. Preferred acids are hydrochloric and fluoboric acids since such acids provide anions in common with anions of preferred compounds of the metals to be deposited, and thus promote stability of the baths and good control of electrodeposition therefrom.

The metals to be deposited are present in the baths as ionic compounds, the anions of the compounds and other conditions being chosen such that the compounds are substantially completely soluble in the aqueous medium. Accordingly, the compounds may be present as halides, sulfates, or otherwise but preferably the compounds will have anions common to the anions of the acid utilized to provide the high acidity. Since hydrochloric and fluoboric acids are the preferred acids, the preferred metal compounds will be the chlorides and fluoborates of the metals.

The metal compounds may be dispersed and dissolved in the aqueous medium in any suitable manner with heating and agitation, as needed. Sequence of admixture is not critical although the usual precautions with highly acidic solutions should be exercised. However, dispersion and electroplating are each benefited by somewhat elevated temperature of the bath, of the order of about 50° – 85° C.

As chlorides the following ranges of concentrations of the metal compounds in the baths are effective:

| | |
|---|---|
| cobalt chloride | about 20–400 g./l. |
| stannous chloride | about 10–100 g./l. |
| zinc chloride | about 10–175 g./l. |

To the baths containing the foregoing concentrations of metal compounds may be added hydrochloric acid (37% solution) at a concentration of about 40–150 mils./l., ammonium hydroxide (28% solution) in the range of about 10–50 mls./l. and ammonium bifluoride, about 20–400 g./l., to provide the requisite acidity and bath stability.

When the tin compound is a fluoborate, it is preferred to use fluoboric acid in place of hydrochloric acid. The concentrations of these and other ingredients in the bath may then range as follows:

| | |
|---|---|
| cobalt chloride | about 100–300 g./l. |
| stannous fluoborate (50% solution) | about 25–75 mls./l. |
| fluoboric acid | about 75–225 g./l. |
| ammonium hydroxide (28% solution) | about 25–150 mls./l. |

-continued

| | |
|---|---|
| zinc chloride | about 10–135 g./l. |

Indium chloride as a substitute for zinc chloride preferably is utilized at a concentration of about 5 – 35 g./l. and chromium chloride as a substitute for either of the foregoing compounds is effective at a concentration of about 5 – 55 g./l.

Other conditions of electrodeposition, including the cell form of electrolytic arrangement and type of substrate to be coated, control of concentration and rejuvenation of the baths, are well known in the art and do not require further description. For example, the well known Hull cell may be utilized. The current density preferred for efficient electrodeposition is about 5 – 45 A/ft.$^2$.

Generally, the percentage of each metal in the ternary alloy will vary in direct proportion to the concentration of each metal in the plating bath. To a lesser extent the percentage of each metal in the alloy will also vary in accordance with electroplating conditions such as temperature, current density and pH. It is believed that the new alloy exists as $Sn_2(Co, X)$ or $(Sn, X)_2(Co, X)$ where X is the third metal.

While the resultant ternary alloys are analogous to tin-nickel and tin-cobalt with respect to tarnish resistance, the alloys exhibit not only chromium-like brightness but also consistently good color and color stability. Moreover, while the ternary alloys resist corrosion essentially to the same extent as chromium, they have a higher resistance than chromium to strong alkali under a superimposed anodic potential, that is, whereas chromium will dissolve if made anodic in a caustic solution, the ternary alloys of the invention are not affected. The alloys of the invention therefore are more resistant to chloride attack than chromium and will resist salt spray and salt water contact better than chromium.

The plating baths may contain auxiliary reagents for various purposes in accordance with the understanding in the art. Among such auxiliary reagents are ammonium chloride, gluconic acid, thiourea, fluorides such as ammonium bifluoride, sodium fluoride and potassium titanium fluoride, and various surfactants and the like such as alkyl aryl sodium sulfonate. Such reagents generally are useful in minor amounts, for example, about 0.01 to about 10 grams per liter of plating bath, to obtain their known benefits.

The ternary alloys may be co-deposited electrolytically upon a wide variety of substrates, including metals such as steel, brass and zinc, as well as ceramics and plastics, in accordance with techniques well known in the art for coating such substrates.

The following examples of aqueous plating bath formulations and conditions of electrodeposition are intended as further illustration of the invention but are not necessarily limited of the scope of the invention except as set forth in the claims. All parts and percentages in these examples as well as in the foregoing specification are by weight unless otherwise indicated. In each example the ternary alloy deposited has an approximate composition: tin, 40 – 90%; cobalt, 10 – 50%; third metal, 1 – 28%.

EXAMPLE 1

| | |
|---|---|
| Composition of aqueous bath | |
| Cobalt Chloride | 20–400 g./l. |
| Stannous Chloride | 10–100 g./l. |
| Ammonium Bifluoride | 20–400 g./l. |
| Hydrochloric Acid (37%) | 40–150 mls./l. |
| Ammonium Hydroxide (28%) | 10–50 mls./l. |
| Zinc Chloride | 15–175 g./l. |
| Plating Conditions | |
| Temperature of bath | 60–80° C. |
| Current density | 10–30 A/ft.$^2$ |
| pH of bath | 1–3 |

EXAMPLE 2

| | |
|---|---|
| Composition of aqueous bath | |
| Cobalt Chloride | 20–400 g./l. |
| Stannous Chloride | 10–100 g./l. |
| Ammonium Bifluoride | 20–400 g./l. |
| Hydrochloric Acid (37%) | 40–150 mls./l. |
| Ammonium Hydroxide (28%) | 10–50 mls./l. |
| Indium Chloride | 5–35 g./l. |
| Plating Conditions | |
| Temperature | 60–80° C. |
| Current density | 10–30 A/ft.$^2$ |
| pH of bath | 1–3 |

EXAMPLE 3

| | |
|---|---|
| Composition of aqueous bath | |
| Cobalt Chloride | 20–400 g./l. |
| Stannous Chloride | 10–100 g./l. |
| Ammonium Bifluoride | 20–400 g./l. |
| Hydrochloric Acid (37%) | 40–150 mls./l. |
| Ammonium Hydroxide (28%) | 10–50 mls./l. |
| Chromium Chloride | 5–55 g./l. |
| Plating Conditions | |
| Temperature | 60–80° C. |
| Current density | 10–30 A/ft.$^2$ |
| pH of bath | 1–3 |

EXAMPLE 4

| | |
|---|---|
| Composition of aqueous bath | |
| Cobalt Chloride | 100–300 g./l. |
| Stannous Fluoborate (50%) | 25–75 mls./1. |
| Fluoboric Acid | 75–225 g./l. |
| Ammonium Hydroxide (28%) | 25–150 mls./l. |
| Zinc Chloride | 10–g./l. |
| Plating Conditions | |
| Temperature | 50–85° C. |
| Current density | 5–45 A/ft.$^2$ |
| pH | 1–3 |

EXAMPLE 5

| | |
|---|---|
| Composition of aqueous bath | |
| Cobalt Chloride | 100–300 g./l. |
| Stannous Fluoborate (50%) | 25–75 mls./l. |
| Fluoboric Acid | 75–225 g./l. |
| Ammonium Hydroxide (28%) | 25–150 mls./l. |
| Chromium Chloride | 10–75 g./l. |
| Plating Conditions | |
| Temperature | 50–85° C. |
| Current density | 5–45 A/ft.$^2$ |
| pH | 1–3 |

EXAMPLE 6

| | |
|---|---|
| Composition of aqueous bath | |
| Cobalt Chloride | 100–300 g./l. |
| Stannous Fluoborate (50%) | 25–75 mls./l. |
| Fluoboric Acid | 75–225 g./l. |
| Ammonium Hydroxide (28%) | 25–150 mls./l. |
| Indium Chloride | 5–35 g./l. |
| Plating Conditions | |
| Temperature | 50–85° C. |
| Current density | 5–45 A/ft.$^2$ |
| pH | 1–3 |

What is claimed is:

1. A bright, tarnish resistant and color stable ternary alloy consisting essentially of about 40 – 90 wt. % tin 10 – 50 wt. % cobalt 1 – 28 wt. % third metal wherein said third metal is antimony, *zinc* or a metal of Periodic Group [$II_B$,] $III_A$ or $VI_B$.

[2. A ternary alloy as in claim 1 wherein said third metal is zinc, cadmium, indium, or chromium.]

3. A ternary alloy as in claim 1 wherein said third metal is zinc, indium or chromium.

* * * * *

UNITED STATES PATENT AND TRADEMARK OFFICE

CERTIFICATE OF CORRECTION

PATENT NO. : Reissued 29,239

DATED : May 31, 1977

INVENTOR(S) : Jacob Hyner et al

It is certified that error appears in the above-identified patent and that said Letters Patent are hereby corrected as shown below:

In Column 4, Example 4, line 6, the amount for Zinc Chloride should be changed from "10-g./l." to --10-135 g./l.-- .

Signed and Sealed this

*First* Day of *August 1978*

[SEAL]

*Attest:*

RUTH C. MASON
*Attesting Officer*

DONALD W. BANNER
*Commissioner of Patents and Trademarks*